United States Patent [19]

Musselwhite

[11] Patent Number: 4,676,461

[45] Date of Patent: Jun. 30, 1987

[54] FLOTATION DEVICES FOR AIRCRAFT UNDERCARRIAGES

[75] Inventor: James Musselwhite, Portsmouth, England

[73] Assignee: FPT Industries Limited, Portsmouth, England

[21] Appl. No.: 768,337

[22] Filed: Aug. 22, 1985

[30] Foreign Application Priority Data

Sep. 6, 1984 [GB] United Kingdom ................ 8422515

[51] Int. Cl.⁴ ............................................ B64C 25/56
[52] U.S. Cl. ...................................... 244/107; 441/93
[58] Field of Search ................... 244/105, 107, 17.17; 441/93; 114/345, 54

[56] References Cited

U.S. PATENT DOCUMENTS 1,766,182  6/1930  Markus ................................. 441/93
2,918,030 12/1959  Bagnall ................................ 114/54

FOREIGN PATENT DOCUMENTS 2719089 11/1977 Fed. Rep. of Germany ...... 244/107
2312408 12/1976 France ............................... 244/105

Primary Examiner—Galen Barefoot
Attorney, Agent, or Firm—Larson and Taylor

[57] ABSTRACT

A flotation device (10) attached to a skid member (11) of an aircraft skid undercarriage comprises a flexible bag member (15) adapted for inflation from a collapsed condition to a shape in which it provides at least partial support for an aircraft when it lands on water. A source of pressurized gas for inflating the bag member comprises a pressurized gas bottle (21) housed within and surrounded by the bag member.

4 Claims, 4 Drawing Figures

FLOTATION DEVICES FOR AIRCRAFT UNDERCARRIAGES

DESCRIPTION OF INVENTION

This invention relates to flotation devices for aircraft undercarriages and is particularly concerned with inflatable flotation devices for use with skid and ski type undercarriages.

It is known to fit inflatable flotation devices to aircraft undercarriages, in particular, to helicopter undercarriages. Examples of proposals for fitting inflatable flotation devices to helicopter undercarriages are to be found in UK-A-904157; UK-A-969470; UK-A-1,185,698; UK-A-1,208,070; UK-1,214,732; U.S. Pat. Nos. 2,670,159; 2,702,171; and 2,955,785.

Early proposals for flotation devices were for permanently inflated flotation bags which were attached to the undercarriage or which formed the undercarriage for landing on both land and water. Such permanently inflated devices had the disadvantage that they gave rise to high aerodynamic drag which decreased the manoeuvrability of an aircraft to which they were fitted.

The requirement to decrease aerodynamic drag gave rise to proposals to fit flotation devices which were collapsed and inflated only when there was a requirement to land on water, see for example UK-A-1,185,698 and UK-A-1,208,070. Where flotation devices are fitted which are inflatable on demand the source of inflation air or gas is generally disclosed as being a compressed air or gas bottle housed within the aircraft structure or a bleed from a compressor stage of a gas turbine engine used to power the aircraft. Such inflation arrangements have a number of disadvantages. In particular they require long pipe runs and joints which are susceptible to fracture and the joints are a source of leaks, and they do not lend themselves to retrofit on existing aircraft. Where the source of inflation air or gas comprises one or more bottles housed within the aircraft structure these have to be located so as to be accessible for replenishment whilst at the same time being suitably protected against the possibility of explosion.

The increased utilisation of helicopters over water which has come about as a result of exploration for and exploitation of offshore oil and gas sources has given rise to a requirement for inflatable flotation devices which can be retrofitted to existing helicopters in particular to helicopters having skid undercarriages.

As a means of decreasing long pipe runs and avoiding the requirement of housing compressed air or gas bottles within the helicopter fuselage consideration has been given to strapping the compressed air or gas bottles to the exterior of an inflatable bag comprising the flotation device; however, this has the disadvantage that the mechanism for activating release of the compressed air or gas from the bottles is exposed to the environment which is particularly corrosive where operation is most frequently over the sea.

It is an object of the present invention to provide an inflatable flotation device which is particularly suitable for retrofit to an existing helicopter or other aircraft undercarriage and which avoids the requirement for long pipe runs and for housing compressed air or gas bottles within the helicopter or aircraft fuselage whilst at the same time protecting the bottles and their actuating mechanisms from the surrounding environment.

According to the present invention an aircraft flotation device comprising a flexible bag member adapted for inflation by a source of pressurised gas from a collapsed condition to a shape in which it provides at least partial support for the aircraft when it lands on water and means for attaching the bag member to an undercarriage member of the aircraft, characterised in that the source of pressurised gas comprises a pressurised gas bottle housed within and surrounded by the bag member.

The term "pressurised gas" should be understood to include air or any other suitable gas such as, for example, carbon dioxide, at a pressure above normal atmospheric pressure.

The bag member is preferably manufactured from fabric reinforced elastomeric material such as, for example, neoprene or natural rubber sheet reinforced with a woven nylon fabric.

As is known per se, the bag member is preferably compartmented by diaphragms extending transversely with respect to the longitudinal centre line of the bag member when it is inflated so that in the event of one of the compartments failing to inflate or being punctured the bag member will retain at least a part of its buoyancy.

The pressurised gas bottle may be housed in a pocket within any one of the compartments of the compartmented bag member and is preferably positioned so that when the flotation device is fitted to an aircraft it lies in a transverse plane through the centre of gravity of the aircraft.

Gas may flow from the pressurised gas bottle to inflate the bag member through reinforced rubber hoses which may run internally or externally of the bag member.

Whilst it is preferred that the pressurised gas for inflating the bag member be supplied from a single gas bottle, more than one gas bottle may be provided if so desired.

In a preferred embodiment of the invention the gas bottle is of generally cylindrical shape and when the bag member is in the collapsed condition the gas bottle lies with its longitudinal axis in a substantially horizontal plane so as to give rise to minimum aerodynamic drag. On inflation of the bag member the gas bottle is adapted to move to a position in which its longitudinal axis lies in a substantially vertical plane.

In a modification of this preferred embodiment of the invention, for further reduction of aerodynamic drag when the bag member is in the collapsed condition, the gas bottle is of high length to diameter ratio having length dimension greater than the vertical height dimension of the inflated bag member. In this modification the pocket housing the gas bottle is configured so that the bottle is moved from a position in which its longitudinal axis is in a substantially horizontal plane when the bag member is in the collapsed condition to a position in which its longitudinal axis lies in a plane between the horizontal and vertical planes when the bag member is inflated.

The invention extends to a skid or ski undercarriage having flotation devices fitted to skid or ski members of the undercarriage, the flotation devices comprising bag members inflatable from a collapsed condition to an inflated shape by pressurised gas supplied from gas bottles housed within and surrounded by the bag members.

The invention will now be further described, by way of example, with reference to the accompanying drawings in which:

FIG. 4 is a section through the skid looking on arrows A—A in FIG. 2.

Figure 1:
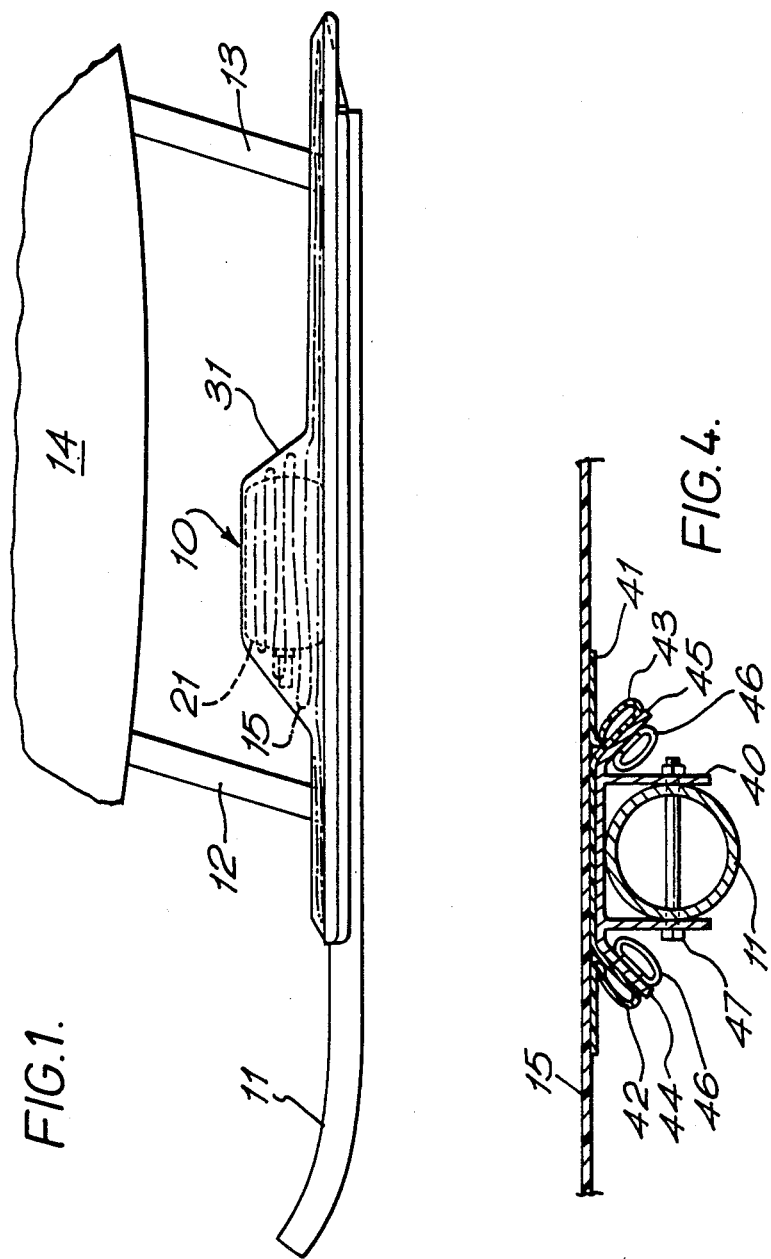
FIG. 1 is a side elevation of a flotation device in accordance with one embodiment of the invention attached to a skid member of a skid undercarriage and with a bag member of the flotation device in a collapsed condition.

Referring to the drawings, a flotation device 10 is shown attached to a skid member 11 of a skid undercarriage, the skid member 11 being carried by support legs 12 and 13 which are attached to structure 14 of a helicopter or other aircraft (not shown in detail).

In this embodiment the flotation device comprises a bag member 15 manufactured from neoprene rubber sheet reinforced with woven nylon fabric. As is best seen in FIGS. 2 and 3 the bag member 15 is divided into three compartments 16, 17 and 18 by two diaphragms 19 and 20 which extend transversely of the longitudinal centre line of the bag member when it is inflated.

With particular reference to FIG. 4, the bag member 15 is attached to the skid member 11 by a bridge member 40 and a strip 41 of neoprene rubber sheet reinforced with woven nylon fabric which is bonded or vulcanised to the underside of the bag member 15. Near to its side edge portions the strip 41 is folded back on itself to form two flanges 42 and 43 which are bolted to downwardly sloping flanges 44 and 45, respectively, of the bridge member 40. The nuts (not shown) securing the bolts on the underside of the bridge flanges 44 and 45 are protected by covers 46. The bridge member 40 is attached to the skid member 11 by bolts 47 which extend through the tube from which the skid member 11 is formed.

A source of pressurised gas for inflating the bag member 15 comprises a bottle 21 containing pressurised gas such as carbon dioxide or air. As is best seen in FIG. 2 the gas bottle 21 is housed within a pocket 22 in the central compartment 17 of the bag member 15. The pocket 22 is defined by wall members 23 which as shown in FIG. 2 have flange members 24 bonded to their upper ends, the flange members 24 also being bonded to the undersurface of the sheet material forming the uppermost surface of the bag member 15 when it is inflated. The bottom of the pocket 22 is closed by a base member 25 which is attached to the lower ends of the walls 23 by flanges 26. The upper end of the pocket 23 is coaxial with an access hole in the top portion of the bag member, the access hole being closed by a cover member 27 laced to reinforcing strips 28 on the bag member 15 by lacing 29.

Figure 2:
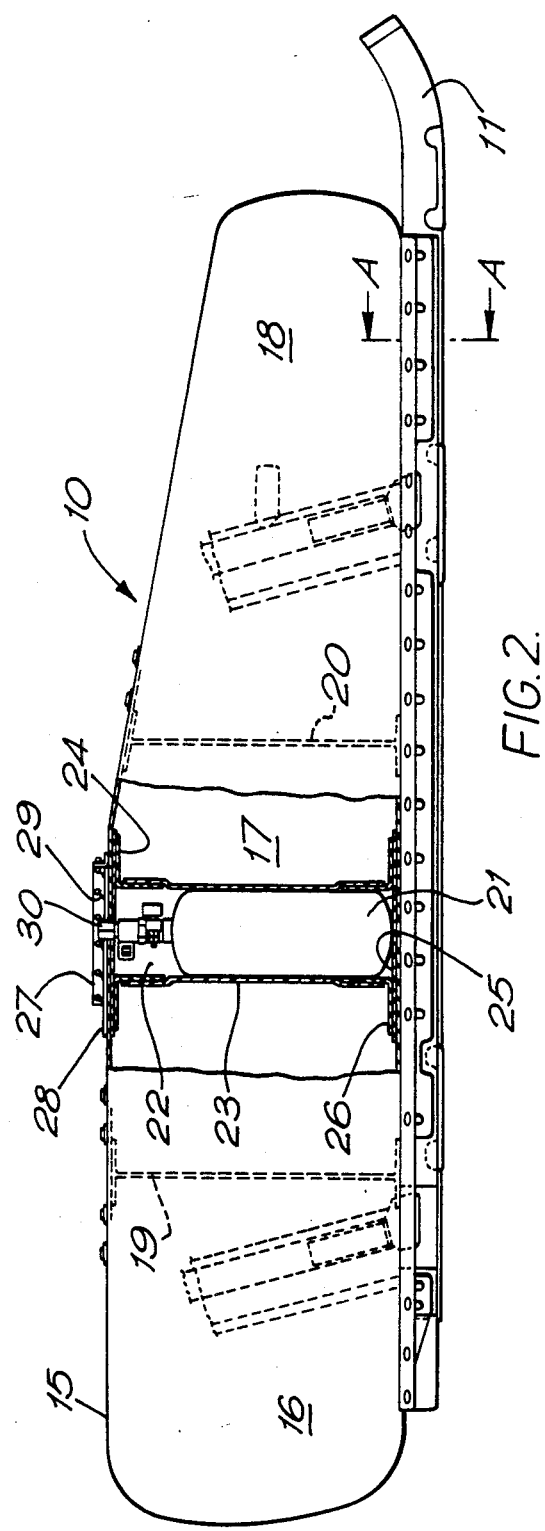
FIG. 2 is a side elevation of the flotation device shown in FIG. 1 with the bag member inflated.
Figure 3:
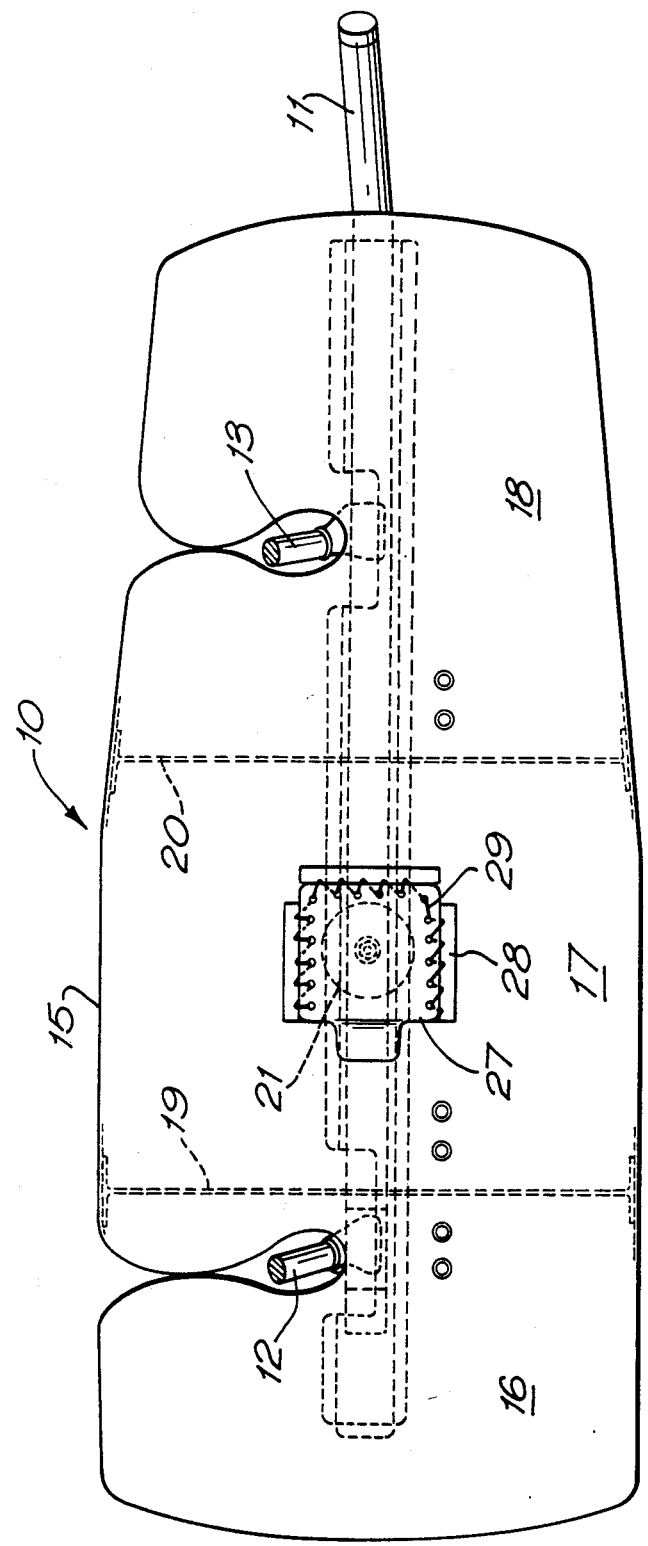
FIG. 3 is a plan view looking on top of the flotation device of FIG. 2.

As shown in FIG. 1, the gas bottle 21 lies with its longitudinal axis in a substantially horizontal plane when the bag member 15 is in a collapsed condition and during inflation of the bag member moves to a position in which its longitudinal axis is in a substantially vertical plane as is shown in FIG. 2.

A gas release mechanism 30 is connected to the upper end of the bottle 21 when it is in the vertical position as shown in FIG. 2, this gas release mechanism 30 being of any suitable type such as that in which an electrically actuated solenoid member pierces a frangible diaphragm to permit release of the pressurised gas from the gas bottle 21. Upon actuation of the gas release mechanism 30 pressurised gas flows from the gas bottle 21 through reinforced rubber hoses (not shown) connected to the gas release mechanism 30 and which may run either externally or internally of the bag member 15 to connect with each of the compartments 16, 17 and 18.

When the flotation device 10 is not in use the bag member 15 is deflated and folded and the gas bottle 21 lies in a horizontal plane as shown in FIG. 1. In this condition the flotation device 10 is protected by a cover 31 which may be of frangible material so that it bursts on inflation of the bag member or the cover 31 may be made from more substantial flexible material and be connected to the bridge member 40 by releasable fastening means such as, for example, push button fasteners (not shown) which release when the bag member 15 is inflated. With the bottle in the horizontal plane the centre of its length is positioned so as to be as near as possible to a transverse plane extending through the centre of gravity of the helicopter so that there is no substantial shift of the centre of gravity if the flotation device has been retrofitted to the helicopter. When there is a requirement to land on water the helicopter pilot pushes a button located at his control panel to cause the electrical system of the helicopter to activate the gas release mechanism 30 and allow pressurised gas to flow from the gas bottle 21 into the compartments 16, 17 and 18 of the bag member 15 whereupon the bag member is inflated to the shape shown in FIGS. 2 and 3. As the bag member 15 inflates the gas bottle 21 moves to a position in which its longitudinal axis is substantially vertical and lies as near as possible in a transverse plane extending through the centre of gravity of the helicopter so that the centre of gravity is not disturbed by inflation of the flotation devices attached to the skid members of the undercarriage.

The advantages of the present invention will be seen to be that the gas bottle for inflating the flotation device is housed externally of the aircraft where it is more readily accessible for replacement and maintenance whilst being protected from the surrounding environment which is particularly corrosive when the aircraft is operating in salt laden air over the sea by being housed completely within the bag member. Also, a flotation device in accordance with the present invention can be readily retrofitted to an existing aircraft undercarriage and positioned close to the centre of gravity of the aircraft whilst being lighter in installation because lengthy pipe runs are avoided.

It will be appreciated, of course, that the embodiment of the invention hereinbefore described with reference to and shown in the accompanying drawings is by way of example and that modifications are possible. For example, in achieving further reduction in aerodynamic drag when the flotation device is not in use and the gas bottle lies in a horizontal plane, the gas bottle may have a high length to diameter ratio so that its length dimension exceeds the overall height dimension of the bag member when it is inflated. In this modification the pocket may be configured so that the gas bottle moves from the horizontal plane to lie in a plane between the horizontal plane and the vertical plane when the bag member is inflated.

What is claimed is:

1. An aircraft flotation device for an aircraft having an undercarriage, a flexible bag member including upper and lower surfaces, means for connecting the lower surface of the bag member to the undercarriage of the aircraft, said flexible bag member being adapted for inflation from a collapsed condition to a shape wherein the upper surface of the bag member is spaced from the lower surface to provide at least partial support for the aircraft when the aircraft lands on water, a pressurized gas bottle located internally of the bag member, means supporting the gas bottle within the bag member between the upper and lower surfaces thereof so that when the bag member is in a collapsed condition the gas bottle has the longitudinal axis thereof in a substantially horizontal plane and when the gas bottle is opened to inflate the bag member said supporting means causes the gas bottle to move towards a position in which its longitudinal axis is in a substantially vertical position as the upper surface of the bag member moves away from the lower surface thereof.

2. An aircraft flotation device as claimed in claim 1, wherein the gas bottle is housed in a pocket within a compartment formed by compartmentation of the bag member by diaphragms which extend transversely of the longitudinal centre line of the bag member when it is inflated.

3. An aircraft flotation device as claimed in claim 1, wherein the gas bottle is of cylindrical shape.

4. An aircraft flotation device as claimed in claim 2, wherein pressurized gas flows from the gas bottle to the compartments of the bag member by way of reinforced rubber hoses.

* * * * *